US012593174B2

(12) United States Patent
Lee

(10) Patent No.: US 12,593,174 B2
(45) Date of Patent: Mar. 31, 2026

(54) AUDIO PROCESSING METHOD AND APPARATUS

(71) Applicant: LG ELECTRONICS INC., Seoul (KR)

(72) Inventor: Jinseong Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 143 days.

(21) Appl. No.: 18/687,034

(22) PCT Filed: Oct. 8, 2021

(86) PCT No.: PCT/KR2021/013904
§ 371 (c)(1),
(2) Date: Feb. 27, 2024

(87) PCT Pub. No.: WO2023/058795
PCT Pub. Date: Apr. 13, 2023

(65) Prior Publication Data
US 2024/0357290 A1    Oct. 24, 2024

(51) Int. Cl.
*H04R 3/00* (2006.01)
*H04L 1/08* (2006.01)
*H04R 3/12* (2006.01)

(52) U.S. Cl.
CPC ................. *H04R 3/12* (2013.01); *H04L 1/08* (2013.01); *H04R 2420/07* (2013.01)

(58) Field of Classification Search
CPC .. G06F 3/165; H04R 3/12; H04R 3/00; H04R 2420/07
USPC ...................................................... 381/77–80
See application file for complete search history.

(56) References Cited

U.S. PATENT DOCUMENTS

| | | | |
|---|---|---|---|
| 10,284,953 B2 * | 5/2019 | Hammer | H04N 21/43076 |
| 10,805,753 B2 * | 10/2020 | Aggarwal | H04L 65/80 |
| 11,070,917 B2 * | 7/2021 | Watson | H04L 1/16 |
| 11,689,655 B2 * | 6/2023 | Feng | H04M 1/72454 |
| | | | 381/104 |
| 11,877,131 B2 * | 1/2024 | Watson | H04R 5/02 |

(Continued)

FOREIGN PATENT DOCUMENTS

KR    10-0923490    10/2009

OTHER PUBLICATIONS

PCT International Application No. PCT/KR2021/013904, International Search Report dated Jun. 28, 2022, 10 pages.

(Continued)

*Primary Examiner* — Disler Paul
(74) *Attorney, Agent, or Firm* — LEE, HONG, DEGERMAN, KANG & WAIMEY

(57) ABSTRACT

An audio processing apparatus according to embodiments comprises: a memory for storing audio data; a radio frequency (RF) unit for wirelessly transmitting a signal that includes the audio data, and wirelessly receiving a signal that includes information indicating a normal connection; and a processor for controlling the memory and the RF unit, wherein the processor can transmit the audio data stored in the memory to one or more speakers through the RF unit, and control the RF unit so that the audio data is retransmitted if information indicating a normal connection cannot be received from at least one speaker from among the one or more speakers.

8 Claims, 4 Drawing Sheets

(56)         References Cited

U.S. PATENT DOCUMENTS

2018/0359691  A1    12/2018  Young
2021/0092578  A1     3/2021  Ryu et al.

OTHER PUBLICATIONS

European Patent Office Application Serial No. 21960007.9, Search Report dated May 12, 2025, 8 pages.

* cited by examiner

AUDIO PROCESSING METHOD AND APPARATUS

CROSS-REFERENCE TO RELATED APPLICATION(S)

This application is the National Stage filing under 35 U.S.C. 371 of International Application No. PCT/KR2021/013904, filed on Oct. 8, 2021, the contents of which is hereby incorporated by reference herein in its entirety.

TECHNICAL FIELD

Embodiments relate to an audio processing method and apparatus.

BACKGROUND

A wireless audio system connected to a communication network (Wi-Fi) may wirelessly transmit audio data from one audio source to multiple speakers (groups) to play audio.

In environments with multiple speakers, when issues arise with some of the speakers, a method is required to provide uninterrupted audio streaming services.

DISCLOSURE

Technical Problem

In embodiments, there are provided a wireless audio processing method and apparatus when multiple speakers are connected.

In embodiments, there are provided an audio processing method and apparatus to address latency and complexity.

The scope of the embodiments is not limited to what has been particularly described hereinabove. That is, the scope of the embodiments may be expanded to include other objects that may be inferred by those skilled in the art Based on the entire content disclosed herein.

Technical Solution

To achieve these objects and other advantages and in accordance with the purpose of the disclosure, as embodied and broadly described herein, provided is an audio processing apparatus. The audio processing apparatus according to embodiments may include: a radio frequency (RF) unit configured to wirelessly transmit a signal including audio data and wirelessly receive a signal including information indicating a normal connection; a memory configured to store the audio data; and a processor configured to control the memory and the RF unit. The processor may be configured to: control the RF unit to transmit the audio data stored in the memory to one or more speakers; and control the RF unit to retransmit the audio data based on a failure to receive the information indicating the normal connection from at least one speaker among the one or more speakers.

Advantageous Effects

A method and apparatus according to embodiments may quickly detect and resolve issues such as power loss or battery detachment in some speakers (sinks) within a group consisting of multiple speakers.

The method and apparatus according to the embodiments may playback audio without interruption through other speakers within a group consisting of a plurality of speakers (sinks).

The method and apparatus according to the embodiments may provide high-quality music streaming services.

BRIEF DESCRIPTION OF THE DRAWINGS

The accompanying drawings, which are included to provide a further understanding of the disclosure and are incorporated in and constitute a part of this application, illustrate embodiments of the disclosure and together with the description serve to explain the principle of the disclosure. For a better understanding of various embodiments described below, reference should be made to the description of the following embodiments in connection with the accompanying drawings. The same reference numbers will be used throughout the drawings to refer to the same or like parts.

FIG. 2 illustrates an audio data processing method according to embodiments.

DETAILED DESCRIPTION

Figure 1:
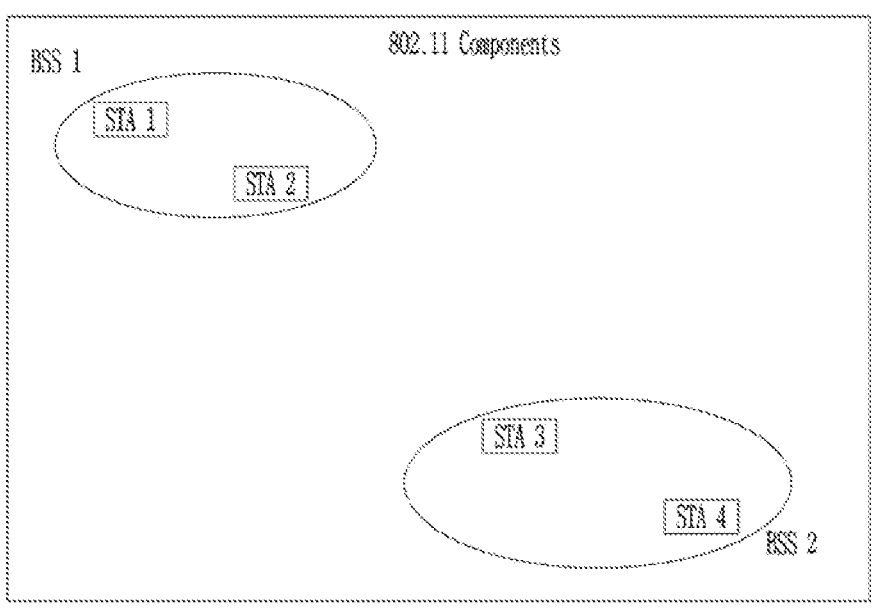
FIG. 1 is a diagram illustrating an exemplary structure of the IEEE 802.11 system to which the present disclosure is applicable.

The accompanying drawings, which are included to provide a further understanding of embodiments, illustrate the embodiments of the present disclosure and serve to explain the principles of the embodiments together with the description. For a better understanding of the embodiments described herein, reference should be made to the following description of the embodiments in conjunction with the following drawings in which like reference numerals refer to corresponding parts throughout the figures.

For clarity of explanation, the present disclosure primarily focuses on IEEE 802.11 (Wi-Fi) technology, but the technical principles of the present disclosure are not limited thereto. For example, the following description may be supported by standard documents disclosed in at least one of the following wireless access systems: IEEE 802 system, 3GPP system, 3GPP Long-Term Evolution (LTE) system, LTE-Advanced (LTE-A) system, and 3GPP2 system. Thus, steps or portions not explicitly described in the embodiments of the present disclosure to clearly demonstrate the technical principles of the disclosure may be supported by the aforementioned documents. Furthermore, all terms disclosed herein may be explained by the aforementioned standard documents.

FIG. 1 exemplarily shows an IEEE 802.11 system according to one embodiment of the present disclosure.

The structure of the IEEE 802.11 system may include a plurality of components. A WLAN which supports transparent STA mobility for a higher layer may be provided by mutual operations of the components. A Basic Service Set (BSS) may correspond to a basic constituent block in an IEEE 802.11 LAN. In FIG. 1, two BSSs (BSS1 and BSS2) are shown and two STAs are included in each of the BSSs (i.e. STA1 and STA2 are included in BSS1 and STA3 and STA4 are included in BSS2). In this case, STA may operate according to MAC (Medium Access Control)/PHY (Physical) rules. STA may include an Access Point (AP) STA (hereinafter referred to as an AP) and a non-AP STA. AP may provide network (e.g., WLAN) connection to a non-AP STA through a radio interface. AP may be implemented as a fixed type or a mobile type, and may include mobile wireless devices (e.g., a laptop computer, a smartphone, etc.) for providing a hot spot. The AP may correspond to a base station (BS), a Node-B, an evolved Node-B (eNB), a base transceiver system (BTS), a femto BS, etc. The non-AP STA may correspond to a handheld device, for example, a laptop computer, a PDA, a wireless modem, a smartphone, etc. In the following description, the non-AP STA may be referred to as a terminal, a Wireless Transmit/Receive Unit (WTRU), a User Equipment (UE), a Mobile Station (MS), a mobile terminal, or a Mobile Subscriber Station (MSS).

An ellipse indicating the BSS in FIG. 1 may be understood as a coverage area in which STAs included in the corresponding BSS maintain communication. This area may be referred to as a Basic Service Area (BSA). In the IEEE 802.11 LAN, the most basic type of BSS is an Independent BSS (IBSS). For example, the IBSS may have a minimum form consisting of only two STAs. The BSS (BSS1 or BSS2) of FIG. 1, which is the simplest form and in which other components are omitted, may correspond to a typical example of the IBSS. Such configuration is possible when STAs can directly communicate with each other. Such a type of LAN is not prescheduled and may be configured when the LAN is necessary. This may be referred to as an ad-hoc network.

Memberships of an STA in the BSS may be dynamically changed when the STA is switched on or off or the STA enters or leaves the BSS region. The STA may use a synchronization process to join the BSS. To access all services of a BSS infrastructure, the STA should be associated with the BSS.

Figure 2:
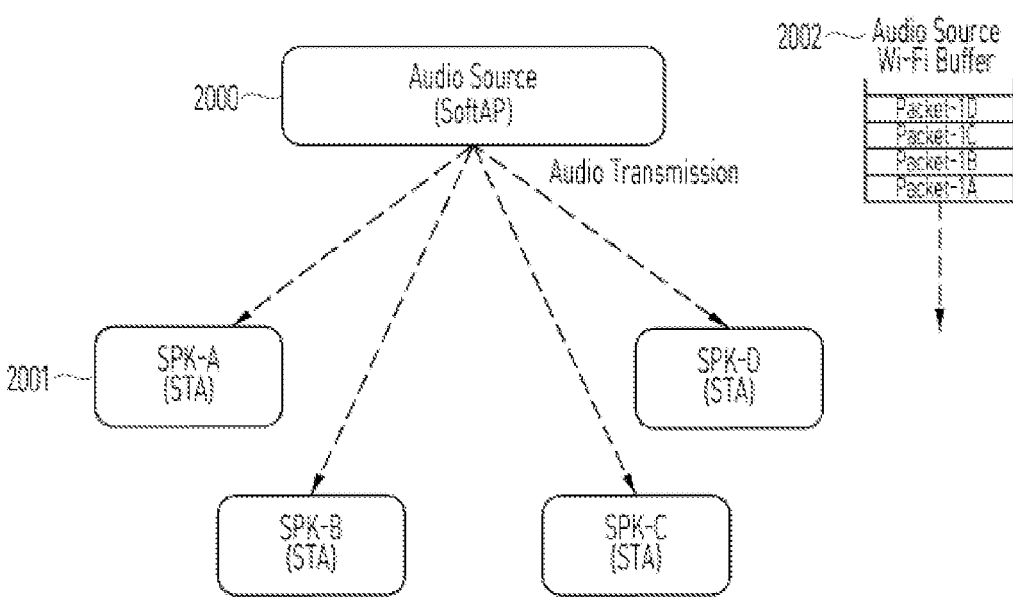
FIG. 2 illustrates the structure of a wireless audio apparatus for multi-room functionality according to embodiments.

FIG. 2 illustrates the structure of a wireless audio apparatus for multi-room functionality according to embodiments.

FIG. 2 may be implemented on a network (Wi-Fi) described in FIG. 1.

An audio source 2000 may represent an audio processing apparatus according to embodiments. The audio source 2000 may transmit audio data (or simply audio) to one or more sinks (speakers 20001, for example, speaker A to speaker D). An environment where there are multiple sinks related to a single source and audio is transmitted and received over a wireless network (e.g., Wi-Fi) may be referred to as a multi-room environment according to embodiments. The audio source 2000 may provide users with such a multi-room environment by simultaneously transmitting audio to speakers based on the wireless network.

An audio source buffer 2002 may be a buffer that stores data transmitted by the audio source 2000. The audio stored in the buffer 20002 may have a packet form. Packets A to D may be stored in the buffer and transmitted sequentially from the source 2000 to sinks 2001.

In a wireless audio system based on Wi-Fi, the multi-room functionality refers to a function of grouping one audio source and multiple wireless speakers and playing audio from the audio source through the multiple wireless speakers. Speakers in a group may be freely added, facilitating system expansion.

To provide the multi-room functionality, the audio source and speakers (SPKs) may be connected in Wi-Fi soft access point/station (AP/STA) mode to perform wireless audio transmission. During group audio playback, if the power cord of a speaker accidentally disconnects or the battery is removed, the connection is terminated with no Wi-Fi connection release procedure. As a result, the audio source is unaware of the disconnection of the speaker, leading to repetitive retransmission (back-off operation).

Due to repeated retransmission to the disconnected SPK, audio transmission to other speakers may not be completed within a specified time, causing problems such as sound jumping or interruption.

The existing Wi-Fi disconnection detection function is performed every few seconds, causing inconvenience to users.

The audio processing apparatus according to the embodiments may efficiently detect and respond to abnormal wireless connection losses occurring in wirelessly connected audio systems.

As shown in FIG. 2, in a wireless audio system connected to Wi-Fi, audio may be wirelessly transmitted from one audio source to multiple speakers (group) for playback. In embodiments, there are provided a method of quickly detecting problematic connections, even in environments where some speakers within the group experience power cord disconnection or battery removal. This enables uninterrupted audio transmission to other speakers, thereby improving the quality of music streaming services.

The multi-room environment according to the embodiments may be implemented with devices such as an audio dongle and/or sound bar.

Figure 3:
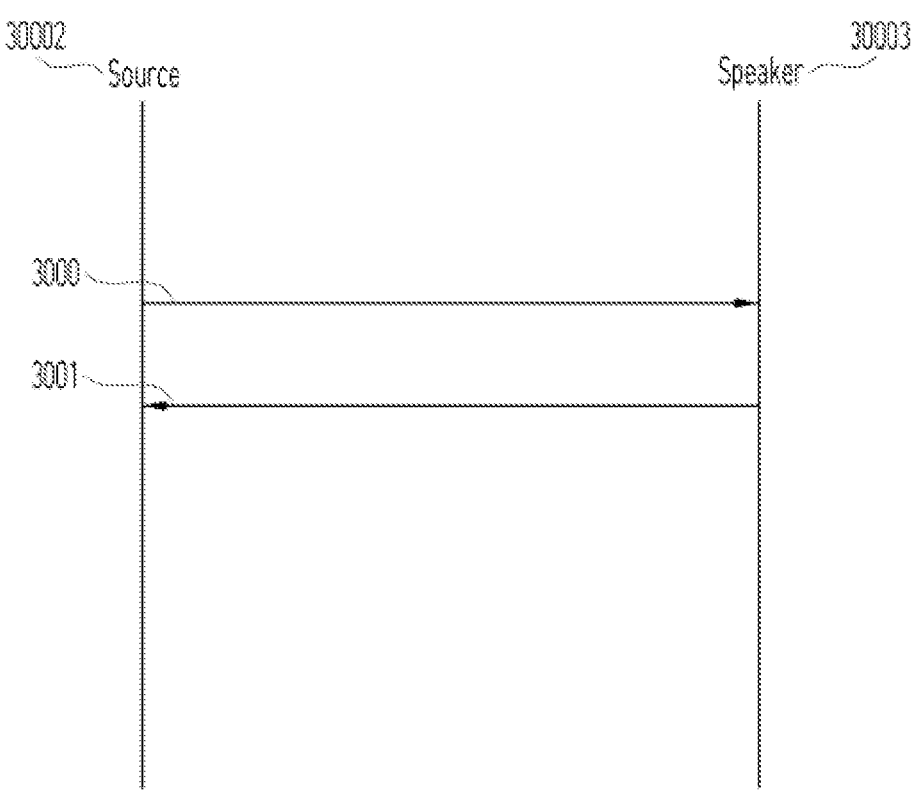
FIG. 3 illustrates a flowchart of data transmission between a source and a sink according to embodiments.

FIG. 3 illustrates a flowchart of data transmission between a source and a sink according to embodiments.

An audio processing apparatus according to embodiments illustrated in FIG. 2 may perform data processing as shown in FIG. 3 on the network described in FIG. 1.

A source 30002 according to embodiments may correspond to the audio source 2000 in FIG. 2, and a speakers 30003 according to embodiments may correspond to the speakers 2001 in FIG. 2. The source may transmit data frames to transfer audio data to the sink (3000). The sink may receive the data frames. Upon receiving the data frames, the sink may transmit acknowledgement (ACK) information to notify the source of a successful connection (3001). Upon receiving the ACK information, the sink may confirm that the wireless network-based connection is normal. In cases where the connection is abnormal or encounters issues, processing solutions may be required to ensure uninterrupted audio streaming in multi-room architectures as shown in FIG. 2.

Therefore, when the multi-room operation is performed in a wireless audio system, if connection loss issues is not be resolved efficiently, Other packets that need to be transmitted to different speakers may also be affected, causing inconvenience to users such as audio interruption.

The audio processing method/apparatus according to the embodiments may efficiently generate and transmit/receive data frames for connection detection.

In addition, the audio processing method/apparatus according to the embodiments may provide uninterrupted multi-audio services without the complexity of analyzing background traffic for data transmission.

Hereinafter, the operations of relevant embodiments will be described in detail.

Figure 4:
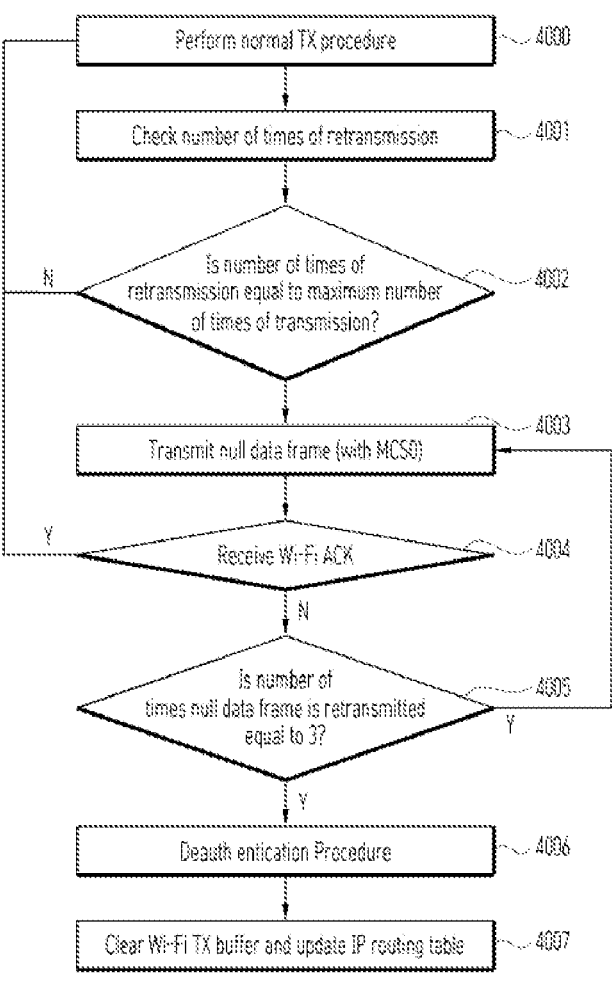
FIG. 4 illustrates an audio data processing method according to embodiments.

FIG. 4 illustrates an audio data processing method according to embodiments.

FIG. 4 shows a method in which the audio processing apparatus 2000 according to the embodiments of FIG. 2 transmits audio data to speakers based on a wireless network (FIG. 1).

If Keep-Alive is applied between an audio source and speakers (SPKs), it is possible to detect abnormal connection losses. However, if the Keep-Alive interval is long, detection performance decreases, and if the Keep-Alive interval is too short, wireless performance is degraded.

Additionally, when reception (RX) terminates abnormally, Wi-Fi generates a negative ACK. However, it is necessary to differentiate whether the negative ACK is due to transmission errors or abnormal RX termination issues.

In step 4000, the audio processing apparatus according to the embodiments may perform a normal transmission (TX) procedure. The audio processing apparatus may transmit audio data to one or more speakers through wireless network of FIG. 1 based on the architecture of FIG. 2.

In step 4001, the audio processing apparatus according to the embodiments may retransmit audio data (packets) if the audio processing apparatus fails to receive an ACK from at least one speaker while performing the TX procedure. Retransmission may be performed more than once. The audio processing apparatus according to the embodiments may check the number of times of retransmission.

In other words, while transmitting packets including audio, the audio processing apparatus or Wi-Fi transmitter (TX) according to the embodiments checks whether the maximum number of times of retransmission is reached. The maximum number of times of retransmission according to embodiments may vary depending on the traffic type (Voice, Best Effort, etc.). For example, according the embodiments, the maximum number of times of retransmission may be configured based on traffic types such as voice or best effort.

In step 4002, the audio processing apparatus according to the embodiments may verify if the number of times of retransmission equals the maximum value. If the number of times of retransmission is not equal to the maximum value, the audio processing apparatus performs the normal TX procedure. If the number of times of retransmission is equal to the maximum value, the audio processing apparatus proceeds to step 4003. While performing transmission, the soft AP Wi-Fi TX detects cases where retransmission is performed up to the maximum number for a specific STA. The maximum number of times of retransmission may have various values depending on the embodiments.

When the number of times of retransmission reaches the maximum number of times of retransmission, a null data frame is transmitted to related devices (e.g., speakers in the multi-room environment). The null data frame is transmitted at the lowest modulation and coding scheme (MCS) available in the current connection state (e.g., MCS0).

In step 4003, when the number of times of retransmission reaches the maximum number of times of retransmission, the null data frame is transmitted to a corresponding STA with the lowest MCS, regardless of the link adaptation algorithm of the current TX scheduler The audio processing apparatus according to the embodiments may provide an optimal detection method for confirming connection state by transmitting the null data frame with the lowest MCS.

In step 4004, when the audio processing apparatus according to embodiments receives a network ACK, the audio processing apparatus performs the normal TX procedure. If the audio processing apparatus according to the embodiments fails to receive the network ACK, the audio processing apparatus proceeds to step 4005. If the audio processing apparatus fails to receive a Wi-Fi ACK for the transmitted null data frame, the audio processing apparatus repeats the normal TX operation. When the audio processing apparatus receives no Wi-Fi ACK, the audio processing apparatus retransmits the null data frame up to three times. The maximum number of times of retransmission, three times of retransmission may vary depending on the embodiments.

When the audio processing apparatus according to the embodiments fails to receive an ACK even after retransmitting the null data frame up to three times in step 4005, the audio processing apparatus determines that the corresponding STA is terminated abnormally and triggers a deauthentication procedure in step 4006. In step 4007, the audio processing apparatus clears a TX buffer 2002 and updates an Internet protocol (IP) routing table. The reason for this is to prevent audio from being incorrectly transmitted during abnormal termination and/or connection errors. If the audio processing apparatus receives no ACK while retransmitting the null data frame three times, the audio processing apparatus determines that the Wi-Fi connection with the corresponding device is disconnected and transmits a deauthentication frame three times (to prevent false alarms).

As a result, the audio processing method/apparatus according to the embodiments effectively reduces the time required to detect abnormally terminated STAs. For example, the time required to detect an abnormally terminated STA in the prior art is about more than 10 seconds, the embodiments may complete the detection in 200 ms or less.

In addition, the audio processing method/apparatus according to the embodiments may seamlessly playback audio through other speakers within the group without interruption even if a speaker is abnormally terminated during the multi-room operation, thereby enhancing the quality of music streaming services.

Furthermore, the audio processing method/apparatus according to the embodiments has the advantage of enabling all Wi-Fi-based applications to be used collectively without the implementation of Keep-Alive.

The audio processing method/apparatus according to the embodiments may improve the time required to detect Wi-Fi connection termination between devices by transmitting a null data frame when the maximum number of retransmissions is reached during Wi-Fi transmission. Specific configuration conditions according to embodiments are defined as follows.

Trigger conditions for null data frame (Keep-Alive) according to embodiments:

The audio processing method/apparatus according to the embodiments may trigger transmission of the null data frame when the number of times of Wi-Fi retransmission reaches the maximum number of times of retransmission.

Method of transmitting null data frame (Keep-Alive) according to embodiments:

The audio processing method/apparatus according to the embodiments may generate the null data frame based on the lowest MCS. For example, the audio processing apparatus may transmit the null data frame three times. According to embodiments, the number of times of transmission may be configured to be suitable for the environment according to the embodiments.

Method of handing null data frame (Keep-Alive) transmission failure according to embodiments:

The audio processing method/apparatus according to the embodiments may detect connection failures and transmit deauthentication (to prevent false alarms). The audio processing apparatus may clear the buffer for the corresponding device in the Wi-Fi TX buffer. Since the corresponding device is abnormally terminated, the audio processing apparatus deletes packets within the TX buffer without transmitting the packets. Then, the audio processing apparatus may update the IP routing table.

Figure 5:
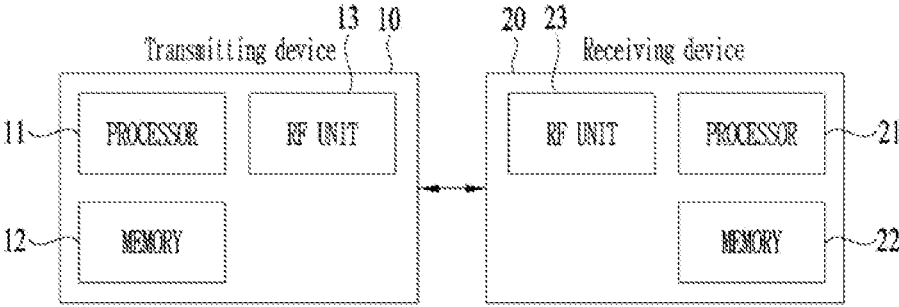
FIG. 5 illustrates a transmitting device and a receiving device according to embodiments.

FIG. 5 illustrates a transmitting device and a receiving device according to embodiments.

FIG. 5 is a block diagram illustrating components of a transmitting device 10 and a receiving device 20 for performing operations according to embodiments.

The transmitting device 10 and the receiving device 20 include: radio frequency (RF) units 13 and 23 for transmitting or receiving radio signals carrying information, data, signals, and/or messages; and memories 12 and 22 for various storage purposes. In a wireless communication system, processors 11 and 21 are operatively connected to components including the RF units 13 and 23 and the memories 12 and 22, control the memories 12 and 22 and/or the RF units 13 and 23, and perform at least one operation according to the embodiments.

The memories 12 and 22 may store programs for handling and controlling the processors 11 and 21 and temporarily store input/output signals. The memories 12 and 22 may be used as buffers.

In general, the processors 11 and 21 may control the overall operations of various modules of the transmitting and receiving devices. In particular, the processors 11 and 21 may perform various control functions to implement the present disclosure. The processors 11 and 21 may be referred to as controllers, microcontrollers, microprocessors, microcomputers, and so on. The processors 11 and 21 may be implemented using various means, such as hardware, firmware, software, or combinations thereof. The embodiments may be implemented in hardware including, for example, application specific integrated circuits (ASICs), digital signal processors (DSPs), digital signal processing devices (DSPDs), programmable logic devices (PLDs), field programmable gate arrays (FPGAs), and so on. The components for performing the embodiments may be included in the processors 11 and 21. When the operations or functions of the embodiments are implemented by firmware or software, the firmware or software may include modules, procedures, functions, etc. for performing the functions or operations of the embodiments. The firmware or software configured to perform the embodiments may be included in the processors 11 and 21. Alternatively, the firmware or software may be stored in the memories 12 and 22 and executed by the processors 11 and 21.

The processor 11 of the transmission device 10 codes and modulates signals and/or data scheduled to be transmitted to an external device by the processor 11 or a scheduler connected to the processor 11 and then transmits the signals. The processor 11 also transmits the data to the RF unit 13. For example, the processor 11 transforms a data stream to be transmitted to the K-layer through demultiplexing, channel coding, scrambling, modulation, and so on. The coded data stream may be referred to as a codeword. One transport block (TB), which is a data block provided by the MAC layer, is encoded into one codeword, and each codeword is transmitted to the receiver in the form of one or more layers. For frequency up-conversion, the RF unit 13 may include an oscillator. The RF unit 13 may include Nt transmission antennas (where Nt is a positive integer).

The signal processing by the reception device 20 may follow a reverse process to the signal processing by the transmission device 10. Under the control of the processor 21, the RF unit 23 of the reception device 20 receives a radio signal transmitted by the transmission device 10. The RF unit 23 may include Nr reception antennas (where Nr is a positive integer). The RF unit 23 performs frequency down-conversion for each signal received through each reception antenna and restores the baseband signal. The RF unit 23 may include an oscillator for frequency down-conversion. The processor 21 may decode and demodulate the radio signals received through the reception antennas and reconstruct the source data transmitted by the transmission device 10.

Each of the RF units 13 and 23 includes one or more antennas. The antennas are responsible for transmitting signals processed by the RF units 13 and 23 to an external device, receiving radio signals from an external device, and transmitting the radio signals to the RF units 13 and 23 under the control of the processors 11 and 21. The antennas may also be referred to as antenna ports. Each antenna may be composed of a single physical antenna or a combination of two or more physical antenna elements. The signal transmitted through each antenna is not decomposed at the reception device 20. A reference signal (RS) that is transmitted through the antenna defines the antenna from the perspective of the reception device 20 and allows the reception device 20 to perform channel estimation. This may be independent of whether the channel is a single radio channel from a single physical antenna or a synthesized channel from a plurality of physical antenna elements including the antenna. In other words, the antenna is defined such that a channel for transmitting a symbol through the antenna is derived from a channel for transmitting another symbol through the same antenna. In the case of an RF unit that supports the multiple input multiple output (MIMO) function, which uses multiple antennas to transmit and receive data, two or more antennas may be connected.

In the embodiments, a UE operates as the transmission device 10 on the uplink and as the reception device 20 on the downlink. In the embodiments, an eNB operates as the reception device 20 on the uplink and as the transmission device 10 on the downlink. The processor, RF unit, and memory included in the UE are referred to as a UE processor, UE RF unit, and UE memory, respectively. The processor, RF unit, and memory included in the eNB are referred to as an eNB processor, eNB RF unit, and eNB memory, respectively.

A detailed description of exemplary embodiments has been provided to enable those skilled in the art to implement and practice the embodiments. Although the embodiments have been described with reference to exemplary embodiments, those skilled in the art will appreciate that various modifications and variations can be made to the present disclosure without departing from the spirit or scope of the disclosure as set forth in the appended claims. Accordingly, the present disclosure should not be limited to specific embodiments described herein, but should be viewed in the broadest sense consistent with the principles and novel features disclosed herein.

In addition to wireless communication systems for providing Internet of things (IoT) services based on LTE systems, the embodiments may be applied to various wireless systems that support narrowband communications for providing IoT services.

The transmitting and receiving devices 10 and 20 may correspond to the audio source 2000. The memories 12 and 22 may correspond to the buffer 2002. The processors 11 and 21 may handle the operations described above in FIGS. 2 to 4.

According to embodiments, an audio processing apparatus may include: a memory configured to store audio data; an RF unit configured to wirelessly transmit a signal including the audio data and wirelessly receive a signal including information indicating a normal connection; a memory configured to store the audio data; and a processor configured to control the memory and the RF unit. The processor may be configured to: control the RF unit to transmit the audio data stored in the memory to one or more speakers; and control the RF unit to retransmit the audio data based on a failure to receive the information indicating the normal connection from at least one speaker among the one or more speakers. Furthermore, the audio processing apparatus may receive audio data from the RF unit and store the received data in the memory.

According to embodiments, the processor may retransmit the audio data if the processor fails to receive the information indicating the normal connection from the at least one speaker among the one or more speakers.

According to embodiments, the processor may check the number of times that the audio data is retransmitted; retransmit the audio data based on that the number of times of retransmission is smaller than the maximum number of times of transmission; and transmit a null data frame to the at least one speaker in an abnormal connection state based on that the number of times of retransmission is equal to the maximum number of times of transmission. The null data frame may generated based on the lowest MCS.

According to embodiments, the processor may transmit the audio data based on reception of the information indicating the normal connection from the at least one speaker after transmitting the null data frame; and retransmit the null data frame based on a failure to receive the information indicating the normal connection.

According to embodiments, the processor may transmit the null data frame based on that the number of times that the null data frame is retransmitted is smaller than a specific value. Based on that the number of times that the null data frame is retransmitted is equal to the specific value, the processor according to embodiments may revoke authentication for the at least one speaker; clear the memory storing the audio data for the at least one speaker; and update an IP routing table for the at least one speaker.

According to embodiments, the specific value may correspond to 3.

The embodiments have been described in terms of a method and/or a device, and the description of the method and the description of the device may be applied complementary to each other.

Although the accompanying drawings have been described separately for simplicity, it is possible to design new embodiments by combining the embodiments illustrated in the respective drawings. Designing a recording medium readable by a computer on which programs for executing the above-described embodiments are recorded as needed by those skilled in the art also falls within the scope of the appended claims and their equivalents. The devices and methods according to embodiments may not be limited by the configurations and methods of the embodiments described above. Various modifications can be made to the embodiments by selectively combining all or some of the embodiments. Although preferred embodiments have been described with reference to the drawings, those skilled in the art will appreciate that various modifications and variations may be made in the embodiments without departing from the spirit or scope of the disclosure described in the appended claims. Such modifications are not to be understood individually from the technical idea or perspective of the embodiments.

Various elements of the devices of the embodiments may be implemented by hardware, software, firmware, or a combination thereof. Various elements in the embodiments may be implemented by a single chip, for example, a single hardware circuit. According to embodiments, the components according to the embodiments may be implemented as separate chips, respectively. According to embodiments, at least one or more of the components of the device according to the embodiments may include one or more processors capable of executing one or more programs. The one or more programs may perform any one or more of the operations/methods according to the embodiments or include instructions for performing the same. Executable instructions for performing the method/operations of the device according to the embodiments may be stored in a non-transitory CRM or other computer program products configured to be executed by one or more processors, or may be stored in a transitory CRM or other computer program products configured to be executed by one or more processors. In addition, the memory according to the embodiments may be used as a concept covering not only volatile memories (e.g., RAM) but also nonvolatile memories, flash memories, and PROMs. In addition, it may also be implemented in the form of a carrier wave, such as transmission over the Internet. In addition, the processor-readable recording medium may be distributed to computer systems connected over a network such that the processor-readable code may be stored and executed in a distributed fashion.

In the present disclosure, "/" and "," should be interpreted as indicating "and/or." For instance, the expression "A/B" may mean "A and/or B." Further, "A, B" may mean "A and/or B." Further, "A/B/C" may mean "at least one of A, B, and/or C." Also, "A/B/C" may mean "at least one of A, B, and/or C." Further, in this specification, the term "or" should be interpreted as indicating "and/or." For instance, the expression "A or B" may mean 1) only A, 2) only B, or 3) both A and B. In other words, the term "or" used in this document should be interpreted as indicating "additionally or alternatively."

Terms such as first and second may be used to describe various elements of the embodiments. However, various components according to the embodiments should not be limited by the above terms. These terms are only used to distinguish one element from another. For example, a first user input signal may be referred to as a second user input signal. Similarly, the second user input signal may be referred to as a first user input signal. Use of these terms should be construed as not departing from the scope of the various embodiments. The first user input signal and the second user input signal are both user input signals, but do not mean the same user input signals unless context clearly dictates otherwise.

The terms used to describe the embodiments are used for the purpose of describing specific embodiments, and are not intended to limit the embodiments. As used in the description of the embodiments and in the claims, the singular forms "a", "an", and "the" include plural referents unless the context clearly dictates otherwise. The expression "and/or" is used to include all possible combinations of terms. The terms such as "includes" or "has" are intended to indicate existence of figures, numbers, steps, elements, and/or components and should be understood as not precluding possibility of existence of additional existence of figures, numbers, steps, elements, and/or components. As used herein, conditional expressions such as "if" and "when" are not limited to an optional case and are intended to perform the related operation or interpret the related definition according to a specific condition when the specific condition is satisfied.

Operations according to the embodiments described in this specification may be performed by a transmission/reception device including a memory and/or a processor according to embodiments. The memory may store programs for processing/controlling the operations according to the embodiments, and the processor may control various operations described in this specification. The processor may be referred to as a controller or the like. In embodiments, operations may be performed by firmware, software, and/or combinations thereof. The firmware, software, and/or combinations thereof may be stored in the processor or the memory.

The operations according to the above-described embodiments may be performed by the transmission device and/or the reception device according to the embodiments. The transmission/reception device may include a transmitter/receiver configured to transmit and receive media data, a memory configured to store instructions (program code, algorithms, flowcharts and/or data) for the processes according to the embodiments, and a processor configured to control the operations of the transmission/reception device.

The processor may be referred to as a controller or the like, and may correspond to, for example, hardware, software, and/or a combination thereof. The operations according to the above-described embodiments may be performed by the processor. In addition, the processor may be implemented as an encoder/decoder for the operations of the above-described embodiments.

Mode for Disclosure

As described above, related details have been described in the best mode for carrying out the embodiments.

INDUSTRIAL APPLICABILITY

As described above, the embodiments are fully or partially applicable to a point cloud data transmission/reception device and system.

Those skilled in the art may change or modify the embodiments in various ways within the scope of the embodiments.

Embodiments may include variations/modifications within the scope of the claims and their equivalents.

What is claimed is:

1. An audio processing apparatus comprising:
a radio frequency (RF) unit configured to wirelessly transmit a signal including audio data and wirelessly receive a signal including information indicating a normal connection;
a memory configured to store the audio data; and
a processor configured to control the memory and the RF unit,
wherein the processor is configured to:
control the RF unit to transmit the audio data stored in the memory to one or more speakers;
control the RF unit to retransmit the audio data based on a failure to receive the information indicating the normal connection from at least one speaker among the one or more speakers;
check a number of times that the audio data is retransmitted;

retransmit the audio data based on that the number of times of retransmission is smaller than a maximum number of times of transmission; and
transmit a null data frame to the at least one speaker in an abnormal connection state based on that the number of times of retransmission is equal to the maximum number of times of transmission, and
wherein the null data frame is generated based on a lowest modulation and coding scheme (MCS).

2. The audio processing apparatus of claim 1, wherein the processor is configured to:
transmit the audio data based on reception of the information indicating the normal connection from the at least one speaker in the abnormal connection state after transmitting the null data frame; and
retransmit the null data frame based on a failure to receive the information indicating the normal connection.

3. The audio processing apparatus of claim 2, wherein the processor is configured to:
transmit the null data frame based on that a number of times that the null data frame is retransmitted is smaller than a specific value; and
based on that the number of times that the null data frame is retransmitted is equal to the specific value:
revoke authentication for the at least one speaker;
clear the memory storing the audio data for the at least one speaker; and
update an Internet protocol (IP) routing table for the at least one speaker.

4. The audio processing apparatus of claim 3, wherein the specific value is 3.

5. An audio processing method comprising:
generating audio data, wherein the audio data is stored in a memory;
transmitting a signal including the audio data wirelessly through a radio frequency (RF) unit;
receiving a signal including information indicating a normal connection wirelessly through the RF unit;
transmitting the audio data stored in the memory to one or more speakers through the RF unit;
based on a failure to receive the information indicating the normal connection from at least one speaker among the one or more speakers, retransmitting the audio data;
checking a number of times that the audio data is retransmitted;
retransmitting the audio data based on that the number of times of retransmission is smaller than a maximum number of times of transmission; and
transmitting a null data frame to the at least one speaker in an abnormal connection state based on that the number of times of retransmission is equal to the maximum number of times of transmission, and
wherein the null data frame is generated based on a lowest modulation and coding scheme (MCS).

6. The audio processing method of claim 5, further comprising:
transmitting the audio data based on reception of the information indicating the normal connection from the at least one speaker in the abnormal connection state after transmitting the null data frame; and
retransmitting the null data frame based on a failure to receive the information indicating the normal connection.

7. The audio processing method of claim 6, further comprising:

transmitting the null data frame based on that a number of times that the null data frame is retransmitted is smaller than a specific value; and based on that the number of times that the null data frame is retransmitted is equal to the specific value:

revoking authentication for the at least one speaker;

clearing the memory storing the audio data for the at least one speaker; and updating an Internet protocol (IP) routing table for the at least one speaker.

8. The audio processing method of claim 7, wherein the specific value is 3.

\* \* \* \* \*